United States Patent
Anderson et al.

(10) Patent No.: US 8,451,980 B2
(45) Date of Patent: May 28, 2013

(54) TEST SYSTEMS AND METHODS FOR EXTENDED OFF-HOOK CONDITIONS ON A SUBSCRIBER LINE

(75) Inventors: Keith C. Anderson, Aurora, IL (US); Robert W. Navarro, Glen Ellyn, IL (US); Ramfis Rivera-Colon, Aurora, IL (US)

(73) Assignee: Alcatel Lucent, Paris (FR)

( * ) Notice: Subject to any disclaimer, the term of this patent is extended or adjusted under 35 U.S.C. 154(b) by 1370 days.

(21) Appl. No.: 12/147,987

(22) Filed: Jun. 27, 2008

(65) Prior Publication Data

US 2009/0323901 A1    Dec. 31, 2009

(51) Int. Cl.
*H04M 1/24* (2006.01)
(52) U.S. Cl.
USPC ................................ 379/29.03; 379/29.04
(58) Field of Classification Search
USPC ..................... 379/26.01–29.07, 32.04, 207.04
See application file for complete search history.

(56) References Cited

U.S. PATENT DOCUMENTS

| | | | | |
|---|---|---|---|---|
| 5,771,285 A | * | 6/1998 | Wittman | 379/377 |
| 6,005,934 A | * | 12/1999 | Pepper | 379/398 |
| 6,026,145 A | * | 2/2000 | Bauer et al. | 379/22.03 |
| 6,870,903 B2 | * | 3/2005 | Angliss et al. | 379/27.06 |
| 2005/0163308 A1 | * | 7/2005 | Smith et al. | 379/395.01 |

* cited by examiner

*Primary Examiner* — Fan Tsang
*Assistant Examiner* — Akelaw Teshale
(74) *Attorney, Agent, or Firm* — Duft, Bornsen & Fettig, LLP

(57) ABSTRACT

Test systems and methods are disclosed for determining the cause of an extended off-hook condition on a subscriber line. A test system as described herein measures a first resistance of the subscriber line based on a first current, and also measures a second resistance of the subscriber line based on a second current. The test system then determines the difference between the first and second resistance measurements. If the difference between the first and second resistance measurements is greater than a threshold value, such as 20 Ohms or more, then the test system determines that the extended off-hook condition is the result of an off-hook telephone on the subscriber line. If the difference is less than the threshold value, then the test system determines that the extended off-hook condition is the result of a short circuit on the subscriber line.

19 Claims, 5 Drawing Sheets

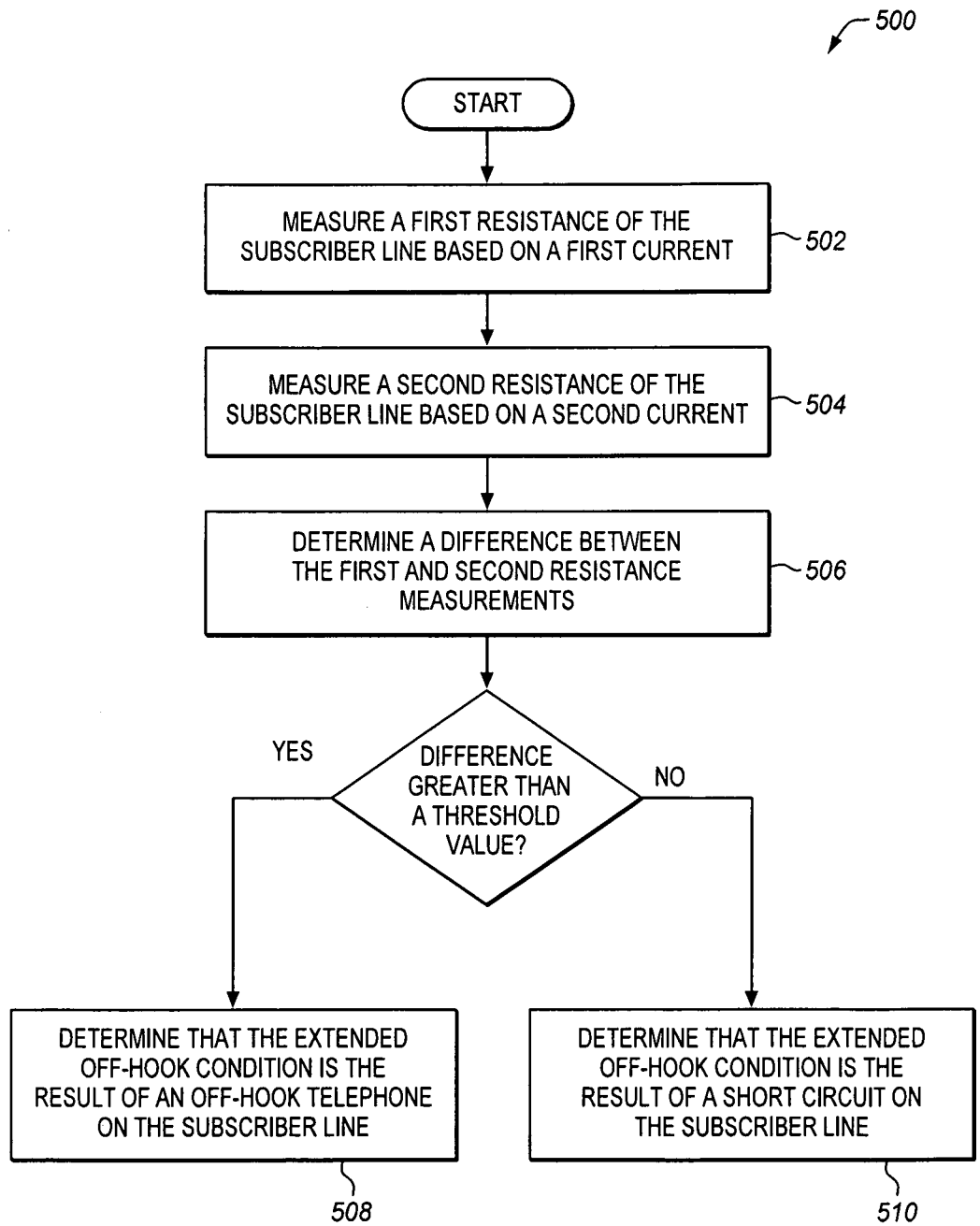

TEST SYSTEMS AND METHODS FOR EXTENDED OFF-HOOK CONDITIONS ON A SUBSCRIBER LINE

BACKGROUND OF THE INVENTION

1. Field of the Invention

The invention is related to the field of communications and, in particular, to test systems and test methods for determining the cause of an extended off-hook condition on a subscriber line.

2. Statement of the Problem

In telephony, a subscriber line (also referred to as the local loop) is the physical link that connects a demarcation point of a customer premises to the edge of the carrier network. One end of the subscriber line connects to one or more telephones at the customer premises, and the other end of the subscriber line connects to a switch housed in a central office (CO) or in a remote unit controlled by the main switch in a central office. Traditionally, the subscriber line is provisioned as a single twisted pair in support of voice communications.

The switch in the central office is able to detect when one or more of the phones at the customer premises goes "off hook", presumably to place a call. To perform the detection functionality, the switch applies a voltage over the subscriber line through a battery voltage that is traditionally −48 volts DC. When all of the telephones that are connected to the subscriber line are "on-hook" (i.e., not being used), then there is an open circuit at the customer premises end of the subscriber line that the switch is able to detect. When one of the telephones is taken "off-hook" (i.e., the phone has been activated for use), the telephone in use completes or closes a circuit over the subscriber line by connecting one of the twisted pair wires to the other through a resistance of the internal circuitry of the telephone. In telephony, the term "off-hook" traditionally refers to the condition that exists when a telephone or other customer premises equipment is in use (i.e., during dialing or communicating). The switch is able to detect when the subscriber line changes from an open circuit to a completed circuit, and provides a dial tone over the subscriber line.

There may be instances where an off-hook condition is sensed by the switch for an extended period of time. The extended off-hook condition may be the result of a handset accidentally being knocked off of a telephone. In such a case, the switch would provide re-order tones over the subscriber line. The extended off-hook condition may alternatively be the result of a fault on the subscriber line, such as a short circuit somewhere along the length of the subscriber line. A short circuit refers to the condition that exists when the twisted pair wires of the subscriber line are electrically shorted across one another. When a short circuit occurs, the switch will detect a change in resistance on the subscriber line from an open circuit to a much lower resistance. In the case of a short circuit, a technician would need to be contacted to locate and remove the short condition.

To test for these extended off-hook conditions, the central office also includes a test system that connects to the subscriber lines. If an extended off-hook condition is detected on a subscriber line, then the test system performs a test method to determine whether the extended off-hook condition is the result of an off-hook telephone or a short circuit on the subscriber line. In one exemplary test method presently used, the test system measures two resistances over the subscriber line at two different currents, and then divides the lower resistance measurement by the higher resistance measurement to determine whether the resulting percentage is less than or greater than a threshold percentage. Some test methods use 15% as the threshold, and others use 50% as the threshold.

For an off-hook telephone, the circuit of the subscriber line comprises the resistances of the twisted pair wires and the resistance of the telephone that is off hook. Most telephones have a non-linear resistance, meaning that the resistance of the telephone decreases as the current (or voltage) increases. In a short circuit, the circuit of the subscriber line comprises the resistances of the twist pair wires up to the location of the short. The resistances of the twisted pair wires are substantially linear. For a linear resistance, an incremental increase in voltage (or current) results in an equivalent incremental increase in current (or voltage).

According to the presently used test methods, the test system determines whether the measured resistances indicate a linear resistance or a non-linear resistance by calculating the percentage of the lower resistance measurement and the higher resistance measurement. A linear resistance on the subscriber line will result in a percentage near 0%, which indicates that the extended off-hook condition is the result of a short circuit on the subscriber line. A non-linear resistance on the subscriber line will result in a much higher percentage (e.g., 15% to 50%), which indicates that the extended off-hook condition is the result of an off-hook telephone.

One problem for the present test systems and methods is that that the amount of non-linearity of telephones is decreasing. Older rotary telephones have a non-linearity of 500 Ohms or more, while newer telephones have a non-linearity of around 100 Ohms. The present test methods using the percentage calculation may not be able to distinguish between an off-hook telephone and a short circuit when newer telephones are used. Also, the test systems are typically fabricated using lower-cost components that have higher manufacturing tolerances (e.g., 10% or more). Due to the manufacturing tolerances, the traditional test systems and methods may not be able to effectively distinguish between an off-hook telephone and a short circuit on a subscriber line.

SUMMARY OF THE SOLUTION

Embodiments of the invention solve the above and other problems with improved test systems and test methods for determining the cause of extended off-hook conditions on subscriber lines. A test system, as described in one embodiment of the invention, measures a first resistance of a subscriber line based on a first current, and also measures a second resistance of the subscriber line based on a second current. Instead of determining a percentage between the first and second resistance measurements as in prior test methods, the test system described herein determines the difference between the first and second resistance measurements (i.e., subtracting the second resistance measurement from the first resistance measurement). If the difference between the first and second resistance measurements is greater than a threshold value, such as 20 Ohms or more, then the test system determines that the extended off-hook condition is the result of an off-hook telephone on the subscriber line. If the difference between the first and second resistance measurements is less than the threshold value, then the test system determines that the extended off-hook condition is the result of a short circuit on the subscriber line.

The test system described herein is advantageously able to effectively distinguish between an off-hook telephone and a short circuit on a subscriber line by taking the difference between the two resistance measurements. Also, by taking the difference between the two resistance measurements, the effects of the manufacturing tolerances of the components of the test systems are negated. The test system may thus be fabricated with lower-cost components while still being able to effectively distinguish between an off-hook telephone and a short circuit.

The invention may include other exemplary embodiments described below.

DESCRIPTION OF THE DRAWINGS

The same reference number represents the same element or same type of element on all drawings.

FIG. 5 is a flow chart illustrating a method of determining the cause of an extended off-hook condition on a subscriber line in an exemplary embodiment of the invention.

DETAILED DESCRIPTION OF THE INVENTION

FIGS. 1-5 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
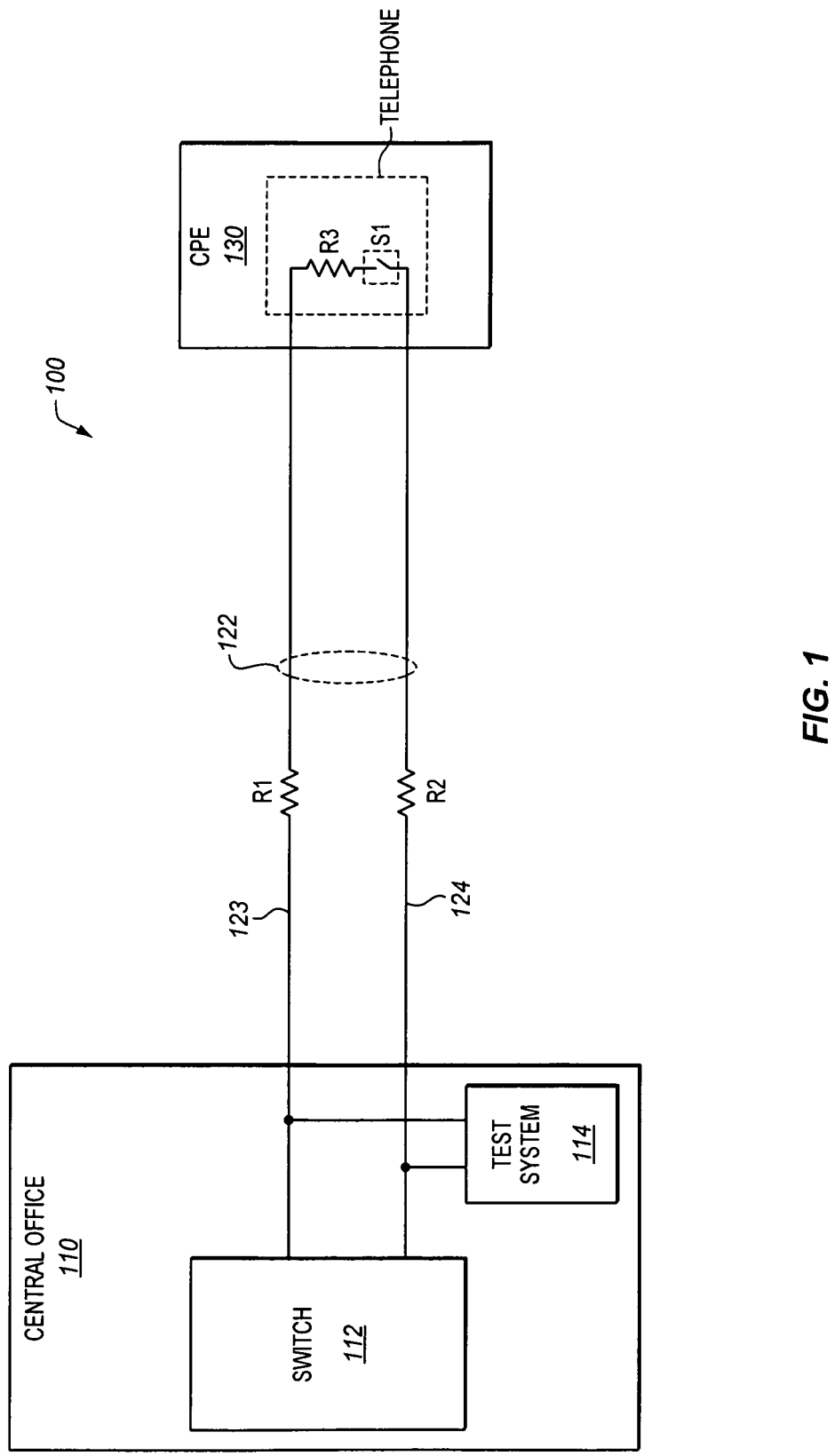
FIG. 1 illustrates a communication network in an exemplary embodiment of the invention.

FIG. 1 illustrates a communication network 100 in an exemplary embodiment of the invention. Communication network 100 is illustrated as including a central office (CO) 110 and customer premises equipment (CPE) 130 that are connected by a subscriber line 122. Although subscriber lines may take on a variety of forms, subscriber line 122 is illustrated as a twisted pair of wires 123-124, such as copper wires. Wire 123 has a resistance indicated by R1, and the resistance R1 depends on the length of wire 123. Similarly, wire 124 has a resistance indicated by R2, and the resistance R2 depends on the length of wire 124.

CPE 130 comprises one or more telephones that are implemented at a customer premises. The term "telephone" as used herein refers to traditional telephones having wired handsets or wireless handsets, and other types of telecommunication devices, such as computers running a telephone application. CPE 130 is illustrated in FIG. 1 as including a telephone represented schematically as a resistance R3 and a switch S1. Resistance R3 represents the resistance of the internal circuitry of a telephone, and switch S1 represents that a telephone creates on open circuit when on-hook, and creates a completed circuit when off-hook. When the telephone is on-hook, the switch S1 is open as indicated in FIG. 1 so that there is an open circuit over subscriber line 122. When the telephone is off-hook, the switch S1 closes and completes the circuit over subscriber line 122. The completed circuit includes the resistance R3 of the telephone (i.e., the resistance of the internal circuitry of the telephone) and includes resistances R1 and R2 of the twisted pair wires 123-124. The resistance R3 of the telephone depends on the current applied over subscriber line 122, as resistance R3 is substantially non-linear.

Central office 110 includes a telecommunication switch 112 that terminates subscriber line 122 on the network side. Central office 110 also includes a test system 114 that electrically connects to subscriber line 122. Test system 114 may comprise hardware, software, and/or firmware that is shared with switch 112 or implemented on a separate platform. Although test system 114 is illustrated inside of central office 110, those skilled in the art will appreciate that test system 114 may be implemented inside of central office 110 or may be implemented external to central office 110. Also, although only one subscriber line 122 is illustrated in FIG. 1, switch 112 and test system 114 may connect to multiple subscriber lines that are not shown.

Figure 2:
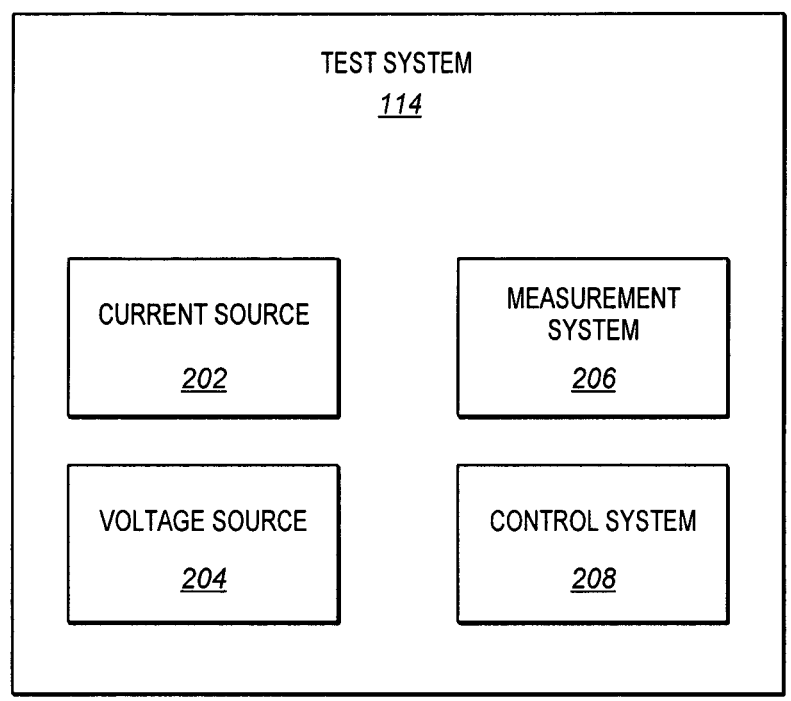
FIG. 2 illustrates a test system in an exemplary embodiment of the invention.

FIG. 2 illustrates test system 114 in an exemplary embodiment of the invention. In this embodiment, test system 114 includes a current source 202, a voltage source 204, a measurement system 206, and a control system 208. Current source 202 comprises any device or component operable to inject a current over a subscriber line. Current source 202 may be adjustable to inject currents in the range of 4 mA to 40 mA. Voltage source 204 comprises any device or component operable to apply a voltage across the twisted pair wires of a subscriber line. Voltage source 204 may be adjustable to apply different voltages across the subscriber line, or may comprise a static source such as a voltage of the batteries used to supply power to switch 112 in central office 110 (see FIG. 1).

Measurement system 206 comprises any system, device, or function operable to measure a resistance of a subscriber line. Measurement system 206 may measure the resistance of a subscriber line in a variety of ways. In one example, measurement system 206 may measure a voltage across the wires of the subscriber line, and divide the measured voltage by a known, injected current. In another example, measurement system 206 may measure a current over the subscriber line, and divide a known, applied voltage by the measured current. Control system 208 comprises any system, device, or function operable to control the voltages applied or current injected over a subscriber line, and to determine the cause of an extended off-hook condition based on resistances measured over the subscriber line.

Figure 3:
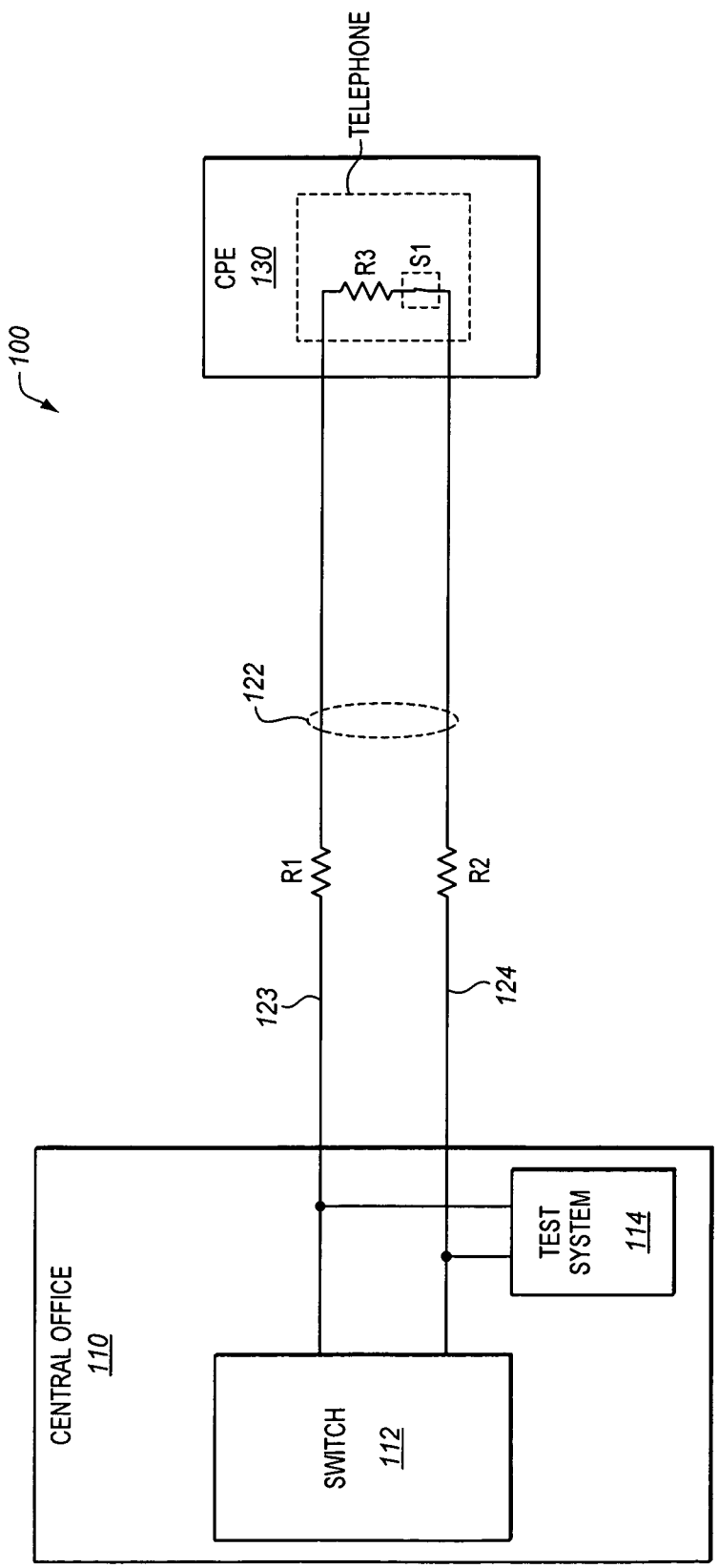
FIG. 3 illustrates an off hook condition in the communication network of FIG. 1.
Figure 4:
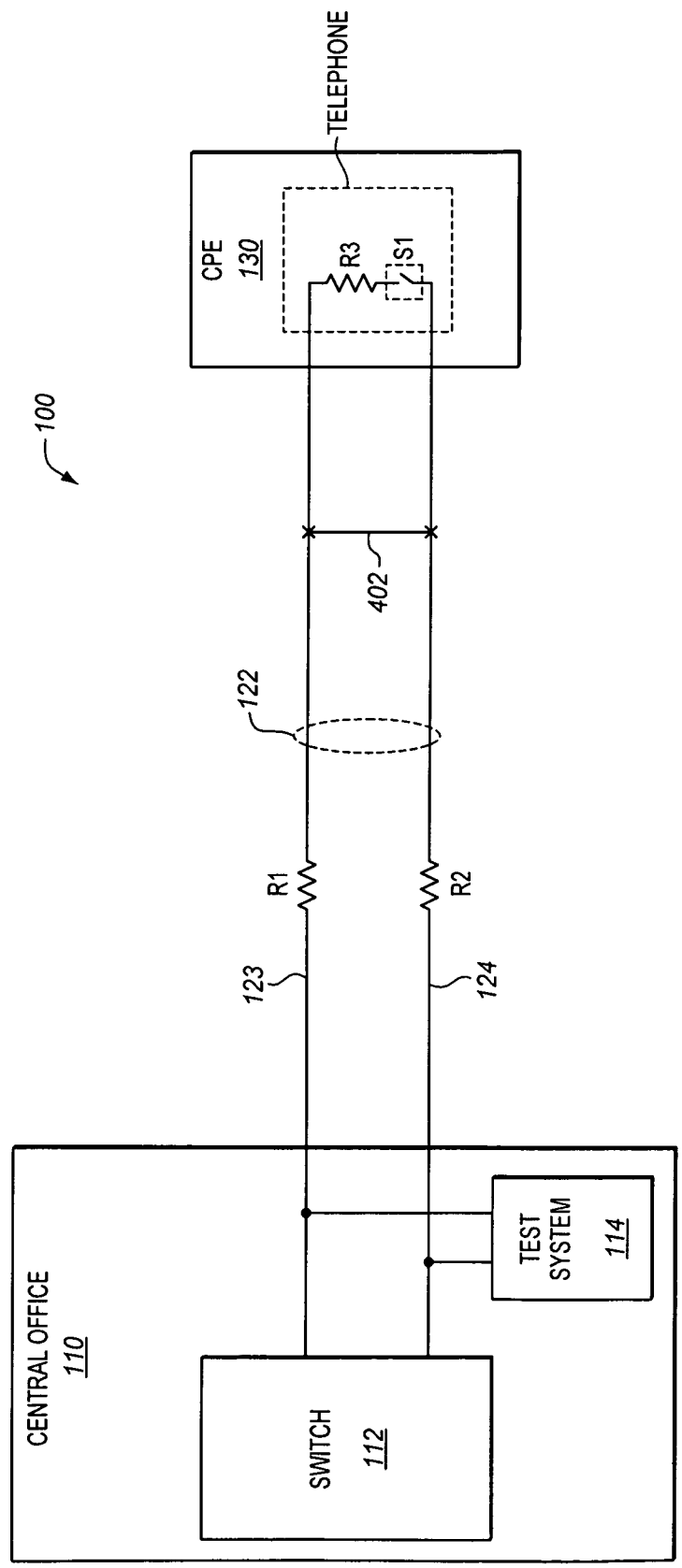
FIG. 4 illustrates a short circuit condition in the communication network of FIG. 1.

In FIG. 1, assume that switch 112 or test system 114 has determined that an extended off-hook condition exists on subscriber line 122. The determination of what comprises an extended off-hook condition is up to the preferences of the network operator. The cause of the extended off-hook condition may be that a telephone of CPE 130 is truly off hook, or that there is a short across wires 123-124. FIG. 3 illustrates an off hook condition in communication network 100. For the off hook condition, the switch SI in the telephone is closed which completes the circuit on subscriber line 122. FIG. 4 illustrates a short circuit condition in communication network 100. In FIG. 4, a short 402 has been created somewhere along the length of subscriber line 122. For either situation, test system 114 is able to perform measurements to determine the cause of the extended off-hook condition.

FIG. 5 is a flow chart illustrating a method 500 of determining the cause of an extended off-hook condition on a subscriber line in an exemplary embodiment of the invention. The steps of method 500 will be described with reference to communication network 100 in FIGS. 1, 3, and 4, and test system 200 in FIG. 2, although method 500 may be performed by other networks and systems. The steps of the flow chart in FIG. 5 are not all inclusive and may include other steps not shown.

For method 500, switch 112, test system 114, or a network operator detects the extended off-hook condition on subscriber line 122. In response to detecting the extended off-hook condition, measurement system 206 measures a first resistance of the subscriber line 122 based on a first current in step 502. In step 504, measurement system 206 measures a second resistance of subscriber line 122 based on a second current. Steps 502 and 504 may be performed in a variety of ways. In one embodiment, control system 208 may instruct current source 202 to inject a minimum current over subscriber line 122. The minimum current represents an approximation of the lowest current that may be injected over subscriber line 122 to measure a resistance of subscriber line 122. For a typical subscriber line 122 (e.g., 2000 Ohms or less), a minimum current may be in the range of 4-6 mA. Control system 208 may then instruct current source 202 to inject an increased current over subscriber line 122. The increased current (also referred to as the maximum current) should be higher than the minimum current by at least a threshold amount, such as 6 mA, 7 mA, 8 mA, etc. For example, if the minimum current injected is 5 mA, then the maximum current injected should be at least 11 mA, 12 mA, 13 mA, etc. The maximum current may be greater than the sum of the threshold amount and the minimum current to provide improved resistance measurements over subscriber line 122. For instance, a minimum current of 5 mA and a maximum current of 40 mA may provide improved resistance measurements on subscriber line 122.

In another embodiment, control system 208 may again instruct current source 202 to inject a minimum current over subscriber line 122. Control system 208 may then instruct voltage source 204 to apply a desired voltage over subscriber line 122 to induce the maximum current. The desired voltage in one embodiment may be based on the maximum battery voltage available in central office 110, which may be 48 volts DC or some voltage near the 48 volts DC. Depending on the length of subscriber line 122, the maximum battery voltage induces a maximum current over subscriber line 122.

In step 506 of method 500, control system 208 determines a difference between the first and second resistance measurements. The difference between the first and second resistance measurements is determined by subtracting the second resistance measurement from the first resistance measurement, or vice versa. Control system 208 then processes the determined difference (or an absolute value of the determined difference) to determine the cause of the extended off-hook condition. If the difference between the first and second resistance measurements is greater than a threshold value, then control system 208 determines that the extended off-hook condition is the result of an off-hook telephone on the subscriber line in step 508. If the difference between the first and second resistance measurements is less than the threshold value, then control system 208 determines that the extended off-hook condition is the result of a short circuit on subscriber line 122 in step 510.

The threshold value is variable and may be dynamically adjusted in control system 208 by network operators. A default for the threshold value in this embodiment may be a value of at least 20 Ohms. Thus, if the difference between the first and second resistance measurements is greater than (or equal to) 20 Ohms, then control system 208 determines that the extended off-hook condition is the result of an off-hook telephone on subscriber line 122. If the difference between the first and second resistance measurements is less than 20 Ohms, then control system 210 determines that the extended off-hook condition is the result of a short circuit on subscriber line 122. A difference between the first and second resistance measurements being greater than (or equal to) 20 Ohms indicates to control system 208 that the total resistance of subscriber line 122 is substantially non-linear. A non-linear resistance further indicates to control system 208 that a telephone is connected in the circuit of subscriber line 122 and is off-hook. A difference between the first and second resistance measurements being less than 20 Ohms, such as near 0 Ohms, indicates to control system 208 that the total resistance of subscriber line 122 is substantially linear. A linear resistance further indicates to control system 208 that a telephone is not connected in the circuit of subscriber line 122 and that the resistance of subscriber line 122 is the result of a short across the twisted pair of wires 123-124. Although a threshold of 20 Ohms is used as an example in this embodiment, the threshold value may be 30 Ohms, 40 Ohms, 100 Ohms, or some other value desired by network operators.

Example #1

For this example, assume that test system 114 in FIG. 1 detects an extended off-hook condition over subscriber line 122. To determine the cause of the extended off-hook condition, control system 208 instructs current source 202 to inject a minimum current over subscriber line 122. In this example, the minimum current is set at 5 mA. Measurement system 206 then measures a first resistance of the subscriber line 122 based on the minimum current. Next, control system 208 instructs voltage source 204 to apply a desired voltage over subscriber line 122 to induce a maximum current. The desired voltage is the maximum battery voltage available (48 volts DC) in central office 110. Assuming that 48 volts is available and that the resistance of subscriber line 122 is about 2000 Ohms, then the maximum current injected over subscriber line 122 is 24 mA (48/2000). Measurement system 206 then measures a second resistance of subscriber line 122 based on the maximum current. Assume for this example that the first measured resistance is 2300 Ohms and the second measured resistance is 2100 Ohms.

Control system 208 then determines or calculates a difference between the first and second resistance measurements, which is 200 Ohms. If the difference between the first and second resistance measurements is greater than a threshold value (such as 20 Ohms), then control system 208 determines that the extended off-hook condition is the result of an off-hook telephone on subscriber line 122. If the difference between the first and second resistance measurements is less than the threshold value, then control system 208 determines that the extended off-hook condition is the result of a short circuit on subscriber line 122. Because the difference between the first and second resistance measurements is 200 Ohms in this example, this indicates to control system 208 that the telephone is in the circuit of subscriber line 122 and is off-hook, as is illustrated in FIG. 3. The telephone is in the circuit of subscriber line 122, so the total resistance of subscriber line 122 is represented by the resistance R1 of wire 123, the resistance R3 of the telephone, and the resistance R2 of wire 124. The non-linearity of the resistance R3 of the telephone causes the difference of the resistance measurements to be 200 Ohms.

Example #2

For this example, assume that test system 114 in FIG. 1 again detects an extended off-hook condition over subscriber line 122. To determine the cause of the extended off-hook condition, control system 208 instructs current source 202 to inject a minimum current of 5 mA over subscriber line 122. Measurement system 206 then measures a first resistance of the subscriber line 122 based on the minimum current. Next, control system 208 instructs voltage source 204 to apply a maximum battery voltage over subscriber line 122 to induce a maximum current (about 24 mA). Measurement system 206 then measures a second resistance of subscriber line 122 based on the maximum current. Assume for this example that the first measured resistance is 1500 Ohms and the second measured resistance is 1500 Ohms.

Control system 208 then determines or calculates a difference between the first and second resistance measurements, which is 0 Ohms. If the difference between the first and second resistance measurements is greater than a threshold value (such as 20 Ohms), then control system 208 determines that the extended off-hook condition is the result of an off-hook telephone on subscriber line 122. If the difference between the first and second resistance measurements is less than the threshold value, then control system 208 determines that the extended off-hook condition is the result of a short circuit on subscriber line 122. Because the difference between the first and second resistance measurements is 0 Ohms in this example, this indicates to control system 208 that the telephone is not in the circuit of subscriber line 122 and there is a short across the twisted pair wires 123-124, as is illustrated in FIG. 4. The telephone is not in the circuit of subscriber line 122 during a short, so the total resistance of subscriber line 122 is represented by the resistance R1 of wire 123 up to the short 402 and the resistance R2 of wire 124 up to the short 402. The linearity of the resistances R1 and R2 causes the difference of the resistance measurements to be about 0 Ohms. Those skilled in the art will appreciate that the actual difference may be greater than zero due to the manufacturing tolerances of test system 114, but is still less than the threshold value of 20 Ohms.

Although specific embodiments were described herein, the scope of the invention is not limited to those specific embodiments. The scope of the invention is defined by the following claims and any equivalents thereof.

We claim:

1. A method for determining the cause of an extended off-hook condition on a subscriber line, the method comprising:
    measuring a first resistance of the subscriber line based on a first current;
    measuring a second resistance of the subscriber line based on a second current;
    determining a difference between the first and second resistance measurements;
    determining that the extended off-hook condition is the result of an off-hook telephone on the subscriber line if the difference between the first and second resistance measurements is greater than a threshold value; and
    determining that the extended off-hook condition is the result of a short circuit on the subscriber line if the difference between the first and second resistance measurements is less than the threshold value.

2. The method of claim 1 wherein the threshold value comprises at least 20 Ohms.

3. The method of claim 1 wherein the first current is between about 4-6 mA.

4. The method of claim 3 further comprising:
    injecting the first current over the subscriber line using a current source.

5. The method of claim 3 wherein the second current is at least 8 mA higher than the first current.

6. The method of claim 5 further comprising:
    applying a voltage over the subscriber line to induce the second current over the subscriber line using a voltage source,
    wherein the voltage is based on a maximum battery voltage used in a central office.

7. A test system operable to determine the cause of an extended off-hook condition on a subscriber line, the test system comprising:
    a measurement system operable to measure a first resistance of the subscriber line based on a first current, and to measure a second resistance of the subscriber line based on a second current; and
    a control system operable to determine a difference between the first and second resistance measurements, to determine that the extended off-hook condition is the result of an off-hook telephone on the subscriber line if the difference between the first and second resistance measurements is greater than a threshold value, and to determine that the extended off-hook condition is the result of a short circuit on the subscriber line if the difference between the first and second resistance measurements is less than the threshold value.

8. The test system of claim 7 wherein the threshold value comprises at least 20 Ohms.

9. The test system of claim 7 wherein the first current is between about 4-6 mA.

10. The test system of claim 9 further comprising:
    a current source operable to inject the first current over the subscriber line.

11. The test system of claim 9 wherein the second current is at least 8 mA higher than the first current.

12. The test system of claim 9 further comprising:
    a voltage source operable to apply a voltage over the subscriber line to induce the second current over the subscriber line, wherein the voltage is based on a maximum battery voltage used in a central office.

13. A communication network operable to determine the cause of extended off-hook conditions on subscriber lines, the communication network comprising:
    at least one subscriber line connected to customer premises equipment;
    a central office having a switch connected to at least one subscriber line; and
    a test system operable to electrically connect to the at least one subscriber line;
    the test system operable to detect an extended off-hook condition on the at least one subscriber line, and responsive to detecting the extended off-hook condition, the test system is further operable to measure a first resistance of the subscriber line based on a first current, to measure a second resistance of the subscriber line based on a second current, to determine a difference between the first and second resistance measurements, to determine that an extended off-hook condition is the result of an off-hook telephone on the subscriber line if the difference between the first and second resistance measurements is greater than a threshold value, and to determine that the extended off-hook condition is the result of a short circuit on the subscriber line if the difference between the first and second resistance measurements is less than the threshold value.

14. The communication network of claim 13 wherein the threshold value comprises at least 20 Ohms.

15. The communication network of claim 13 wherein the first current is between about 4-6 mA.

16. The communication network of claim 15 wherein the test system is further operable to inject the first current over the subscriber line.

17. The communication network of claim 15 wherein the second current is at least 8 mA higher than the first current.

18. The communication network of claim 15 wherein the test system is further operable to apply a voltage over the subscriber line to induce the second current over the subscriber line, wherein the voltage is based on a maximum battery voltage used in a central office.

19. The communication network of claim 13 wherein the test system is implemented within the central office.

* * * * *